(12) United States Patent
Kuhn et al.

(10) Patent No.: US 11,087,559 B1
(45) Date of Patent: Aug. 10, 2021

(54) MANAGING AUGMENTED REALITY CONTENT ASSOCIATED WITH A PHYSICAL LOCATION

(71) Applicant: Apple Inc., Cupertino, CA (US)

(72) Inventors: Michael Kuhn, Los Gatos, CA (US); Justin D. Stoyles, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/088,265

(22) Filed: Nov. 3, 2020

Related U.S. Application Data

(63) Continuation of application No. 17/026,855, filed on Sep. 21, 2020, which is a continuation of application No. 16/140,268, filed on Sep. 24, 2018, now abandoned.

(60) Provisional application No. 62/566,173, filed on Sep. 29, 2017.

(51) Int. Cl.
| | |
|---|---|
| *G06T 19/00* | (2011.01) |
| *G06K 9/00* | (2006.01) |
| *H04W 4/30* | (2018.01) |
| *H04N 21/475* | (2011.01) |
| *G02B 27/01* | (2006.01) |

(52) U.S. Cl.
CPC ........ *G06T 19/006* (2013.01); *G02B 27/0172* (2013.01); *G06K 9/00201* (2013.01); *G06K 9/00671* (2013.01); *H04N 21/4756* (2013.01); *H04W 4/30* (2018.02); *G02B 2027/014* (2013.01); *G02B 2027/0138* (2013.01)

(58) Field of Classification Search
CPC .............. G06T 19/006; G02B 27/0172; G02B 2027/014; G02B 2027/0138; H04N 21/4756; G06K 9/00671; G06K 9/00201; H04W 4/30
See application file for complete search history.

(56) References Cited

U.S. PATENT DOCUMENTS

| | | | |
|---|---|---|---|
| 8,762,047 | B2 | 6/2014 | Sterkel et al. |
| 2011/0258049 | A1 | 10/2011 | Ramer et al. |
| 2013/0027429 | A1 | 1/2013 | Hogg et al. |
| 2013/0201214 | A1 | 8/2013 | Piippo et al. |
| 2015/0040074 | A1 | 2/2015 | Hofmann et al. |

(Continued)

OTHER PUBLICATIONS

Applicant-Initiated Interview Summary received for U.S. Appl. No. 16/140,233, dated Apr. 9, 2020, 4 pages.

(Continued)

*Primary Examiner* — Jeffery A Brier
(74) *Attorney, Agent, or Firm* — Dentons US LLP

(57) ABSTRACT

The present disclosure relates to managing augmented reality content created on a first electronic device and viewed at a second electronic device. In some embodiments, the first electronic device determines its physical location, receives input representing user-generated augmented reality content, displays an augmented reality environment including the user-generated augmented reality content overlaid on a live view of the physical location, and sends the user-generated augmented reality content to an external storage repository. The second electronic device can then receive the user-generated augmented reality content, determine whether it is at the physical location, and display the user-generated augmented reality content when it is at the physical location.

22 Claims, 8 Drawing Sheets

(56) References Cited

U.S. PATENT DOCUMENTS

| | | |
|---|---|---|
| 2016/0142497 A1* | 5/2016 | Ullrich .................. G16H 40/67 715/738 |
| 2016/0284125 A1 | 9/2016 | Bostick et al. |
| 2016/0321551 A1 | 11/2016 | Priness et al. |
| 2016/0350596 A1 | 12/2016 | Bataller et al. |
| 2016/0379409 A1 | 12/2016 | Gavriliuc et al. |
| 2017/0262154 A1 | 9/2017 | Black et al. |
| 2017/0309073 A1 | 10/2017 | Sangiovanni et al. |
| 2017/0316611 A1 | 11/2017 | Sangiovanni et al. |
| 2017/0352183 A1 | 12/2017 | Katz et al. |
| 2018/0080774 A1 | 3/2018 | Sink et al. |
| 2018/0101987 A1 | 4/2018 | Grundhöfer et al. |
| 2018/0109936 A1* | 4/2018 | Ting ........................ H04W 4/30 |
| 2018/0189554 A1 | 7/2018 | Sutton et al. |
| 2018/0197343 A1 | 7/2018 | Hare et al. |
| 2018/0276882 A1 | 9/2018 | Harviainen et al. |
| 2018/0322674 A1 | 11/2018 | Du |
| 2018/0328751 A1 | 11/2018 | Bejot et al. |
| 2019/0107990 A1 | 4/2019 | Spivack et al. |
| 2019/0166462 A1 | 5/2019 | Roberts |
| 2019/0212155 A1 | 7/2019 | Gordon et al. |

OTHER PUBLICATIONS

Applicant-Initiated Interview Summary received for U.S. Appl. No. 16/140,268, dated Jun. 16, 2020, 5 pages.

Corrected Notice of Allowance received for U.S. Appl. No. 16/140,268, dated Aug. 26, 2020, 2 pages.

Final Office Action received for U.S. Appl. No. 16/140,233, dated Jul. 10, 2020, 14 pages.

Non-Final Office Action received for U.S. Appl. No. 16/140,233, dated Nov. 27, 2019, 12 pages.

Non-Final Office Action received for U.S. Appl. No. 16/140,268, dated Jan. 17, 2020, 15 pages.

Notice of Allowance received for U.S. Appl. No. 16/140,268, dated Jul. 15, 2020, 10 pages.

* cited by examiner

MANAGING AUGMENTED REALITY CONTENT ASSOCIATED WITH A PHYSICAL LOCATION

CROSS-REFERENCE TO RELATED APPLICATIONS

This application is a continuation of U.S. patent application Ser. No. 17/026,855, entitled "MANAGING AUGMENTED REALITY CONTENT ASSOCIATED WITH A PHYSICAL LOCATION," filed Sep. 21, 2020, which is a continuation of U.S. patent application Ser. No. 16/140,268, entitled "MANAGING AUGMENTED REALITY CONTENT ASSOCIATED WITH A PHYSICAL LOCATION," filed on Sep. 24, 2018, which claims the benefit of U.S. Provisional Patent Application No. 62/566,173, entitled "MANAGING AUGMENTED REALITY CONTENT ASSOCIATED WITH A PHYSICAL LOCATION," filed on Sep. 29, 2017, which are hereby incorporated by reference in their entireties.

TECHNICAL FIELD

The present disclosure relates generally to augmented reality environments, and more specifically to managing augmented reality content.

BACKGROUND

A physical location refers to a physical environment or a location in a physical environment. Physical locations can include physical objects, such as physical trees, physical buildings, and physical people. Augmented reality is a technology that allows virtual objects to be combined with the physical location and/or physical objects.

SUMMARY

Described herein are techniques for managing augmented reality content created on a first electronic device and viewed at a second electronic device. In some embodiments, a technique at the first electronic device includes determining, using a first location sensor, a physical location of the first electronic device; receiving input representing user-generated augmented reality content; displaying a first augmented reality environment comprising the user-generated augmented reality content overlaid on a live view of the physical location; and sending the user-generated augmented reality content to an external storage repository. The technique at the second electronic device includes receiving the user-generated augmented reality content; determining, using a second location sensor, whether the second electronic device is at the physical location; in accordance with a determination that the second electronic device is at the physical location, displaying a second augmented reality environment comprising the user-generated augmented reality content overlaid on a live view of the physical location.

In some embodiments, the technique further includes determining the first electronic device is authorized to send the user-generated augmented reality content to the external storage repository. In some embodiments, the technique further includes providing authentication information to the external storage repository, wherein the authentication information authorizes the first electronic device to send the user-generated augmented reality content to the external storage repository. In some embodiments, the user-generated augmented reality content includes classification information. In some embodiments, the classification information comprises genre of content, rating of content, type of content, or a combination thereof.

In some embodiments, a system for managing augmented reality content includes a first electronic device including one or more first processors and first memory storing one or more first programs configured to be executed by the one or more first processors; and a second electronic device including one or more second processors and second memory storing one or more second programs configured to be executed by the one or more second processors. The one or more first programs include instructions for determining, using a first location sensor, a physical location of the first electronic device; receiving input representing user-generated augmented reality content; displaying a first augmented reality environment comprising the user-generated augmented reality content overlaid on a live view of the physical location; and sending the user-generated augmented reality content to an external storage repository. The one or more second programs include instructions for receiving the user-generated augmented reality content; determining, using a second location sensor, whether the second electronic device is at the physical location; in accordance with a determination that the second electronic device is at the physical location, displaying a second augmented reality environment comprising the user-generated augmented reality content overlaid on a live view of the physical location.

BRIEF DESCRIPTION OF THE DRAWINGS

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

DETAILED DESCRIPTION

Figure 1A:
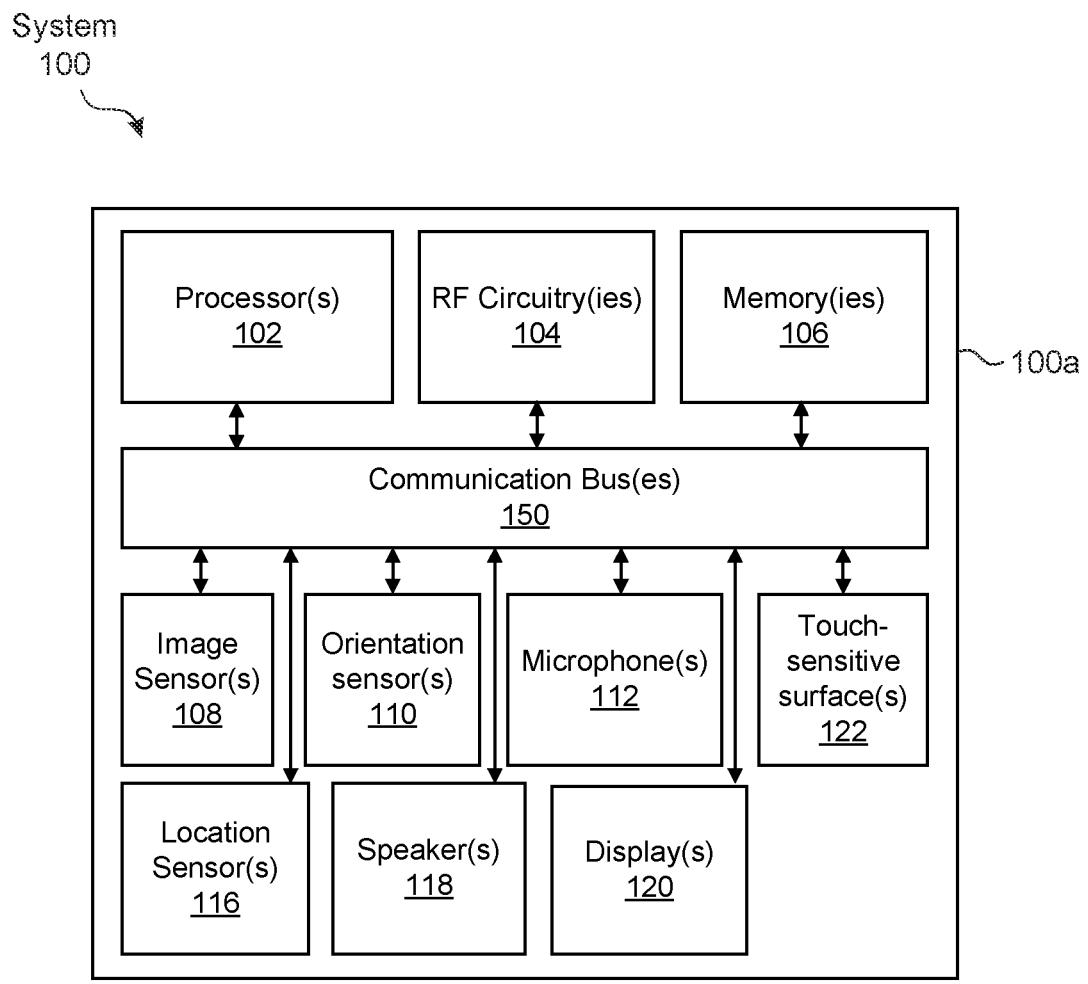
FIGS. 1A-1B depict exemplary systems for use in various computer-generated reality technologies, including virtual reality and mixed reality.

Various embodiments of electronic systems and techniques for using such systems in relation to various computer-generated reality technologies, including virtual reality and mixed reality (which incorporates sensory inputs from a physical environment), are described. In particular, the present disclosure provides techniques for managing augmented reality content created on a first electronic device and viewed at a second electronic device. In some embodiments, the first electronic device determines its physical location, generates augmented reality content associated with the physical location, and sends the augmented reality content to an external storage repository. The second electronic device can then retrieve the augmented reality content created by the first device, and display the content when the second device is at the same physical location where the first device generated the content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
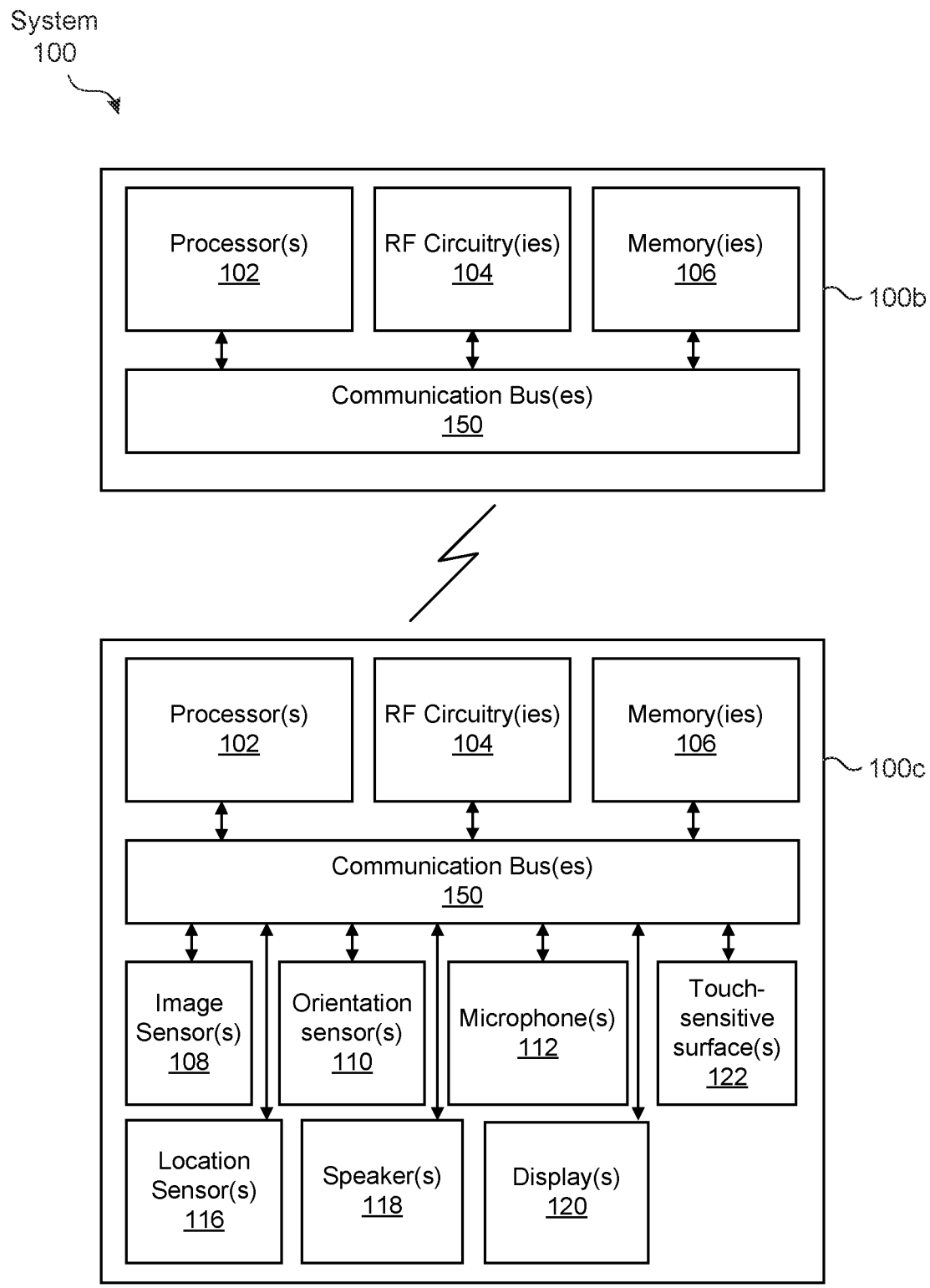

FIG. 1A and FIG. 1B depict exemplary system 100 for use in various computer-generated reality technologies, including virtual reality and mixed reality.

In some embodiments, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some embodiments, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
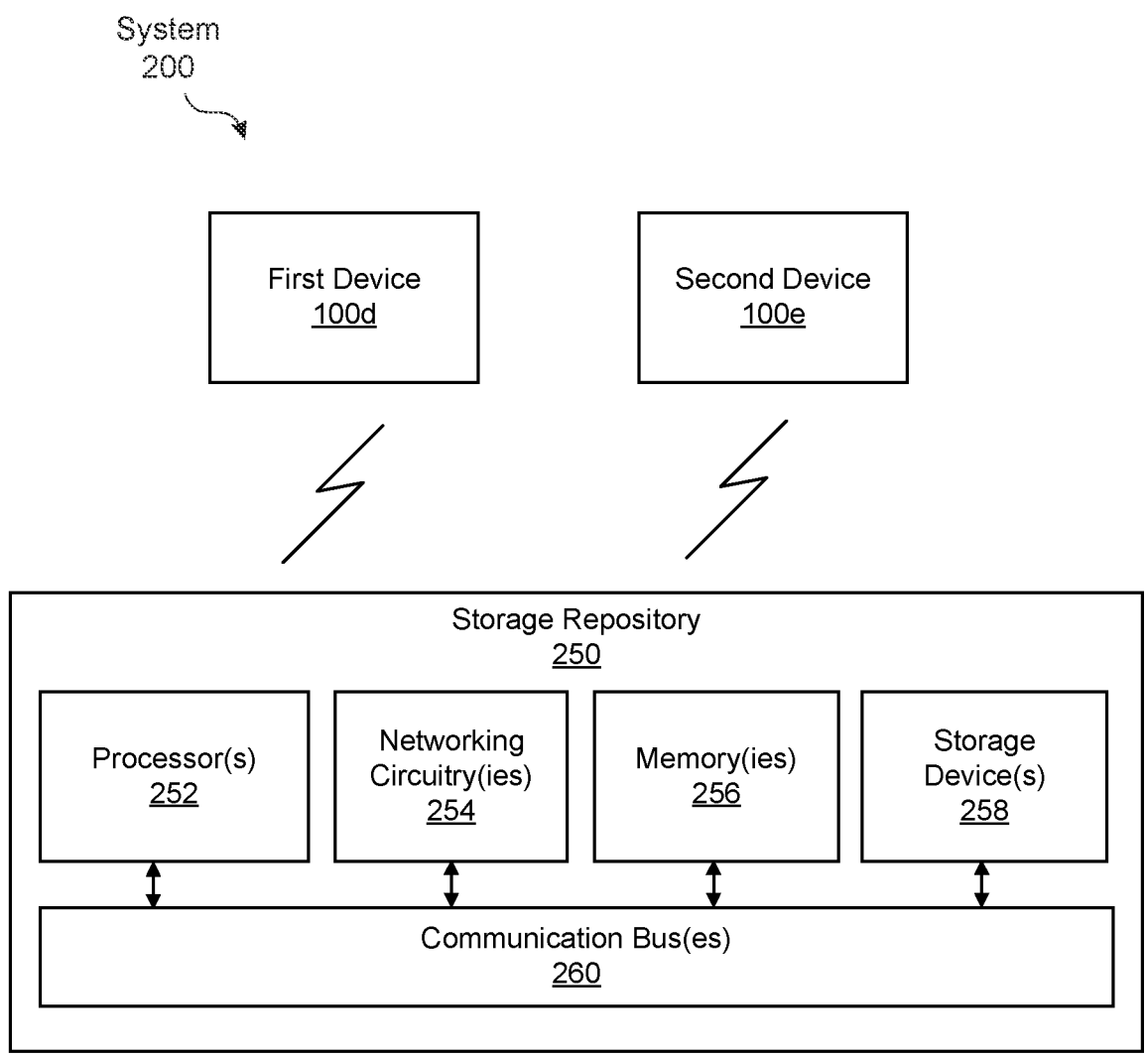
FIG. 2 illustrates an embodiment of a system for managing augmented reality content.

FIG. 2 illustrates an embodiment of system 200 for managing augmented reality content. System 200 includes first device 100d, second device 100e, and storage repository 250. Devices 100d and 100e are each embodiments of system 100, as described in reference to FIGS. 1A-1B. Storage repository 250 is a server or other remote computing device in communication with devices 100d and 100e. Storage repository 250 includes various components, such as processor(s) 252, networking circuitry(ies) 254, memory(ies) 256, and storage device(s) 258. These components optionally communicate over communication bus(es) 260.

Processor(s) 252 include one or more general processors and/or one or more digital signal processors. In some embodiments, memory(ies) 256 are one or more non-transitory computer-readable storage mediums (e.g., flash memory, random access memory) that store computer-readable instructions configured to be executed by processor(s) 252 to perform the techniques described below. Networking circuitry(ies) 254 include circuitry for communicating with electronic devices (such as devices 100d and 100e), networks, such as the Internet, intranets, and/or wireless networks, such as cellular networks and wireless local area networks (LANs). Storage device(s) 258 include devices for storing and retrieving digital information, such as hard disk drives, tape drives, and solid-state drives.

In some embodiments of system 200, augmented reality content is generated on first device 100d, sent to storage repository 250, and then retrieved by second device 100e for viewing. The augmented reality content generated on first device 100d is associated with a particular physical location. In some embodiments, first device 100d determines the physical location using a global positioning system (GPS). In some embodiments, device 100d determines the physical location by detecting physical features present at the physical location (e.g., physical objects or features of physical objects, such as text identifying the location or landmarks associated with the location). First device 100a detects the physical features by obtaining images of the physical location using one or more image sensor(s) (such as image sensor(s) 108 described in reference to FIGS. 1A-1B).

First device 100d generates the augmented reality content in response to receiving input from a user. In some embodiments, first device 100d receives a selection of a virtual object for display, and an indication of where the selected virtual object should be displayed in an augmented reality environment. In some embodiments, the augmented reality content is associated with a particular physical feature at the physical location, such as a wall of a building, a statue, a tree, and so on. For example, when first device 100d receives user input selecting a virtual object (e.g., a hat), first device 100d displays the virtual object overlaying a live view of the physical location. The selected virtual object is then placed on (or associated with) a particular physical feature at the physical location (e.g., the virtual hat appears on the head of a statue at the physical location in the augmented reality environment). As another example, when first device 100d receives user input representing a virtual object (e.g., graffiti), first device 100d displays the virtual object overlaying a live view of the physical location. The virtual object is then placed on (or associated with) a particular physical feature at the physical location (e.g., virtual graffiti appears on the wall of a building at the physical location in the augmented reality environment).

After first device 100d generates the augmented reality content, the content is sent to storage repository 250 where it is stored for later retrieval by other devices (such as second device 100e). The augmented reality content stored at storage repository 250 includes the content itself as well as an indication of the physical location and/or physical feature with which the content is associated. In some embodiments, the augmented reality content includes classification information, such as genre of content (e.g., art, history, games, etc.), rating of content (e.g., explicit or not explicit), and/or type of content (e.g., authorized or unauthorized).

In some embodiments, prior to first device 100d sending the augmented reality content to storage repository 250, a determination is made whether first device 100d is authorized to send the content and/or associate the content with the physical location. For example, a physical location (such as a business) can limit the augmented reality content associated with its physical location to content from authorized devices. In some embodiments, first device 100d is authorized by providing authentication information to storage repository 250, such as a username and password.

In some embodiments, second device 100e retrieves the augmented reality content from storage repository 250 when the location of second device 100e is determined to be at a physical location having associated augmented reality content (e.g., the physical location where first device 100d generated augmented reality content). In some embodiments, second device 100d determines the location using a global positioning system (GPS). In some embodiments, device 100d determines the physical location by detecting physical features present at the location (e.g., text identifying the location or landmarks associated with the location). Second device 100a detects the physical features by obtaining images of the location using one or more image sensor(s) (such as image sensor(s) 108 described in reference to FIGS. 1A-1B).

In some embodiments, in response to a prediction that second device 100e will be located at a physical location in the future having associated augmented reality content (e.g., the physical location where first device 100d generated augmented reality content), second device 100e identifies the associated augmented reality content and retrieves the content from storage repository 250 prior to arriving at the physical location. In some embodiments, second device 100e predicts its future physical location based on a destination received by second device 100e. For example, when second device 100e includes navigation software (e.g., a map application) and receives a destination entered into the navigation software, second device 100e then utilizes the received destination to predict a future physical location of the second device 100e. If the future physical location corresponds to a physical location having associated augmented reality content (e.g., the physical location where first device 100d generated augmented reality content), then second device 100e retrieves the augmented reality content before arriving at the destination.

In some embodiments, second device 100e determines a route to the received destination and identifies whether any additional augmented reality content is available for locations along the route to the destination. If additional augmented reality content is available, then second device 100e retrieves the additional augmented reality content from the storage repository 250 prior to arriving at the locations along the route.

In some embodiments, second device 100e predicts its future physical location based on a direction of travel of second device 100e. For example, when second device 100e determines it is moving north, and the physical location where first device 100d generated augmented reality content is north of the current location of second device 100e, then second device 100 retrieves the augmented reality content from the storage repository 250. In some embodiments, second device 100e detects the direction of travel using an orientation sensor (such as orientation sensor(s) 110 described in reference to FIGS. 1A-1B). In some embodiments, second device 100e detects the direction of travel by determining changes in location as detected by GPS and/or by GPS guidance software.

In some embodiments, second device 100e predicts its future physical location based on using other data sources accessible by second device 100e (e.g., calendar information or location history information). For example, when second device 100e includes calendar information (such as from a calendar application) and the calendar information indicates the location and time of a scheduled appointment, second device 100e utilizes the location and time of the appointment to predict a future physical location of the second device 100e. If the future physical location corresponds to a physical location having associated augmented reality content (e.g., the physical location where first device 100d generated augmented reality content), then second device 100e retrieves the augmented reality content before arriving at the scheduled appointment. As another example, when second device 100e includes location history information (such as from a map application), second device 100e predicts potential future physical locations based on previous locations indicated by the location history information. For example, if the location history information indicates that second device 100e follows approximately the same route at approximately the same time every weekday (such as when a user drives to work), then second device 100e identifies whether any additional augmented reality content is available for locations along the route the second device 100e has a history of following. If additional augmented reality content is available, then second device 100e retrieves the additional augmented reality content from the storage repository 250.

In some embodiments, second device 100e retrieves the augmented reality content when second device 100e determines it is within a predefined proximity to a physical location having associated augmented reality content (e.g., the physical location where first device 100d generated augmented reality content). For example, when second device 100e determines it is within 0.5 miles of a physical location having augmented reality content, then second device 100 retrieves the augmented reality content from the storage repository 250.

In some embodiments, when a variety of augmented reality content associated with a physical location is available, second device 100e filters the available content based on user content preferences. Content preferences include genre of content (e.g., art, history, games, etc.), rating of content (e.g., explicit or not explicit), and/or type of content (e.g., authorized or unauthorized).

In some embodiments, once the augmented reality content is retrieved and second device 100e determines it is at the physical location associated with the content, second device 100e displays an indication of the retrieved augmented reality content. In some embodiments, the indication is an affordance indicating availability of the retrieved augmented reality content for display. In some embodiments, second device 100e provides an alert (e.g., an audible alert and/or a tactile alert) when the retrieved augmented reality content is available for display.

In some embodiments, after displaying the indication and in response to receiving a request to display the retrieved augmented reality content, second device 100e displays the augmented reality content while second device 100e is at the associated physical location. Alternatively or in addition, in some embodiments, once the augmented reality content is retrieved and second device 100e determines it is at the physical location associated with the content, second device 100e automatically displays the augmented reality content. The second device 100e displays the augmented reality content in an augmented reality environment by overlaying the augmented reality content on a live view of the physical location. When the augmented reality content is associated with a particular physical feature at the physical location, second device 100e displays the augmented reality content overlaying the physical feature in the augmented reality environment. For example, when the augmented reality content includes a virtual object (e.g. a hat) associated with a physical feature (e.g., a statue), second device 100e displays the virtual object overlaying a live view of the physical feature (e.g., the hat appears to be on the statue in the augmented reality environment).

Figure 3A:
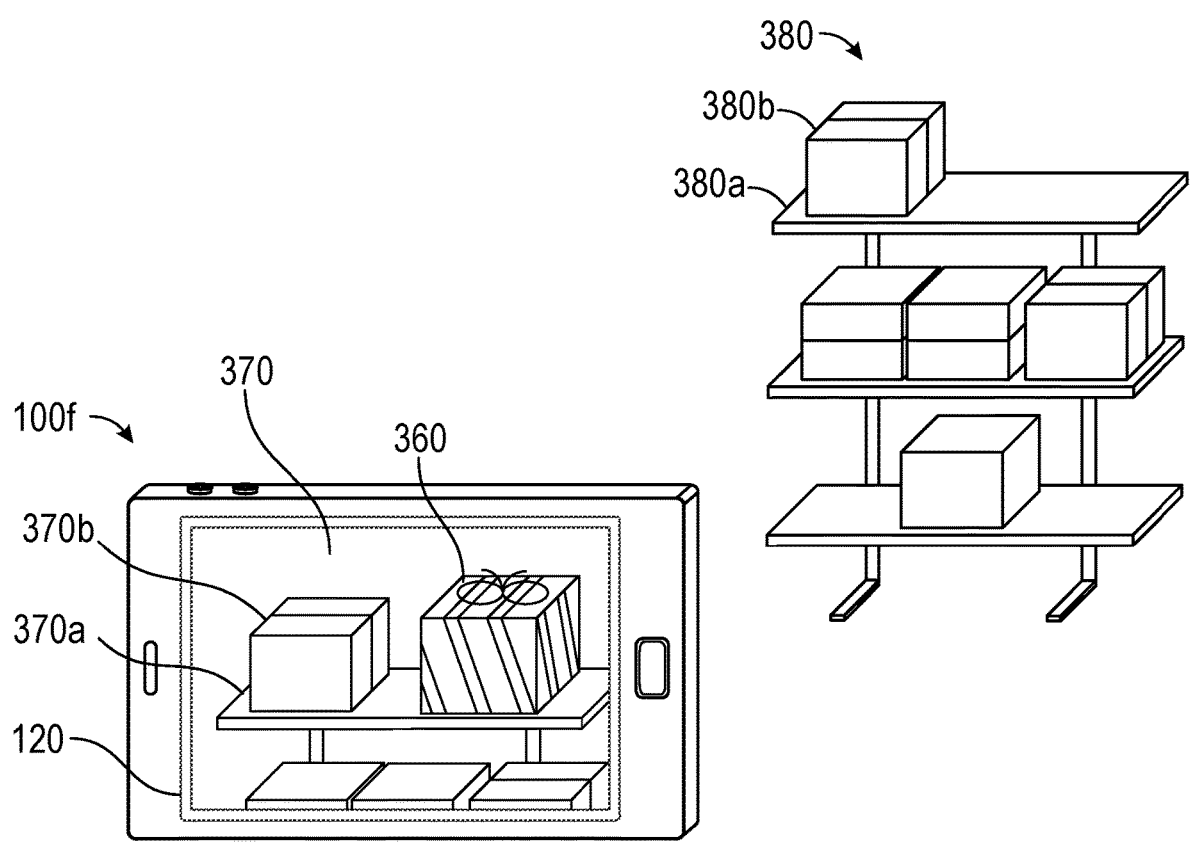
FIG. 3A illustrates an exemplary technique for generating augmented reality content on a first device and sending the content to an external storage repository.

FIG. 3A illustrates an embodiment of device 100f displaying, on display 120, augmented reality content 360. Device 100f is an embodiment of first device 100d described in reference to FIG. 2. In FIG. 3A, device 100f is shown as a mobile device, such as a cellular phone. However, it should be understood that device 100f can be any device configured to display an augmented reality environment.

Device 100f is displaying, on display 120, a representation 370 of retail store 380 with augmented reality content 360. The representation 370 of the retail store 380 includes representation 370a of shelves 380a and representation 370b of merchandise 380b. Device 100f overlays augmented reality content 360 on the representation 370a of shelf 380a. Device 100f tracks the location and/or orientation of shelf 380a with respect to the position and/or orientation of device 100f to display augmented reality content 360 as being on the representation 370a of shelf 380a.

As shown in FIG. 3A, the augmented reality content 360 is a virtual gift. The virtual gift is created by device 100f in response to a user selecting the virtual gift with device 100f. Device 100f also receives an indication that the virtual gift should be displayed on the representation 370a of shelf 380a, which associates the virtual gift with the physical shelf 380a in the retail store 380.

After device 100f generates the augmented reality content 360 (e.g., the virtual gift), the content 360 is sent to a storage repository (such as storage repository 250 described in reference to FIG. 2) where it is stored for later retrieval by other devices (such as second device 100e described in reference to FIG. 2). The augmented reality content 360 sent to the storage repository includes the content itself as well as an indication of the physical feature and location (e.g., the shelf 380a of retail store 380) with which the content 360 is associated.

In some embodiments, prior to device 100f sending the augmented reality content 360 to a storage repository, device 100f provides authentication information to the storage repository, such as a username and password, which authorizes device 100f to send the augmented reality content 360 and/or associate the content 360 with the physical feature and/or location. For example, a physical location (such as a business) can limit the augmented reality content associated with its physical location to content from authorized devices. For example, retail store 380 may require device 100f to be an authorized device of a store employee in order for the virtual gift to be associated with shelf 380a in retail store 380.

Figure 3B:
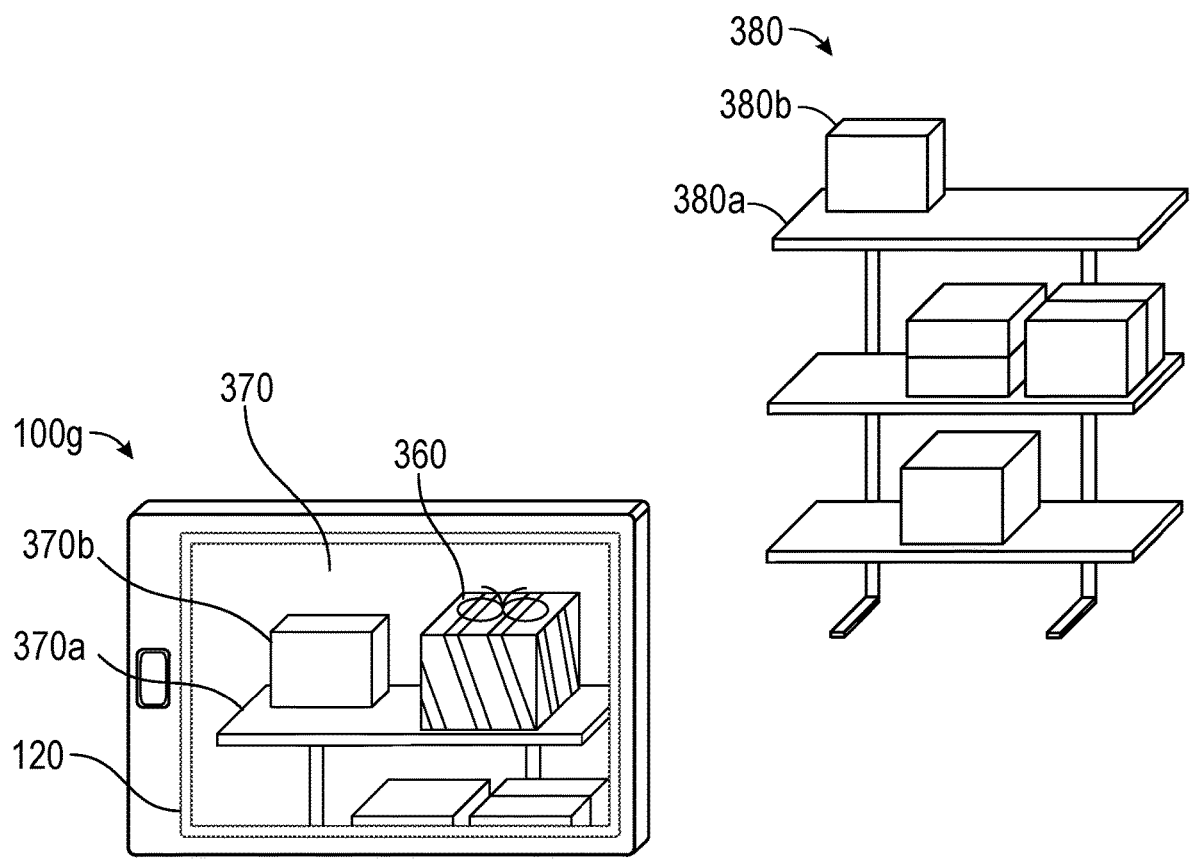
FIG. 3B illustrates an exemplary technique for displaying on a second device the augmented reality content created on a first device.

FIG. 3B illustrates an embodiment of device 100g displaying, on display 120, the augmented reality content 360 created by device 100f, as described in reference to FIG. 3A. Device 100g is an embodiment of second device 100e described in reference to FIG. 2. In FIG. 3B, device 100g is shown as a mobile device, such as an electronic tablet. However, it should be understood that device 100g can be any device configured to display an augmented reality environment.

In some embodiments, device 100g identifies the augmented reality content 360 (e.g., a virtual gift) and retrieves the content 360 from a storage repository (such as storage repository 250 described in reference to FIG. 2) when the location of device 100g is determined to be at retail store 380. In some embodiments, device 100g retrieves the augmented reality content 360 prior to arriving at retail store 380 in response to a prediction that device 100g will be located at retail store 380 in the future.

In some embodiments, once the augmented reality content 360 is retrieved and device 100g determines it is proximate to shelf 380a at retail store 380, device 100g displays an indication of the retrieved augmented reality content 360, such as an affordance indicating availability of the augmented reality content 360 for display. Alternatively, in some embodiments, once the augmented reality content 360 is retrieved and device 100g captures images of shelf 380a at retail store 380, device 100g automatically displays augmented reality content 360 as being on representation 370a of shelf 380a.

Figure 4A:
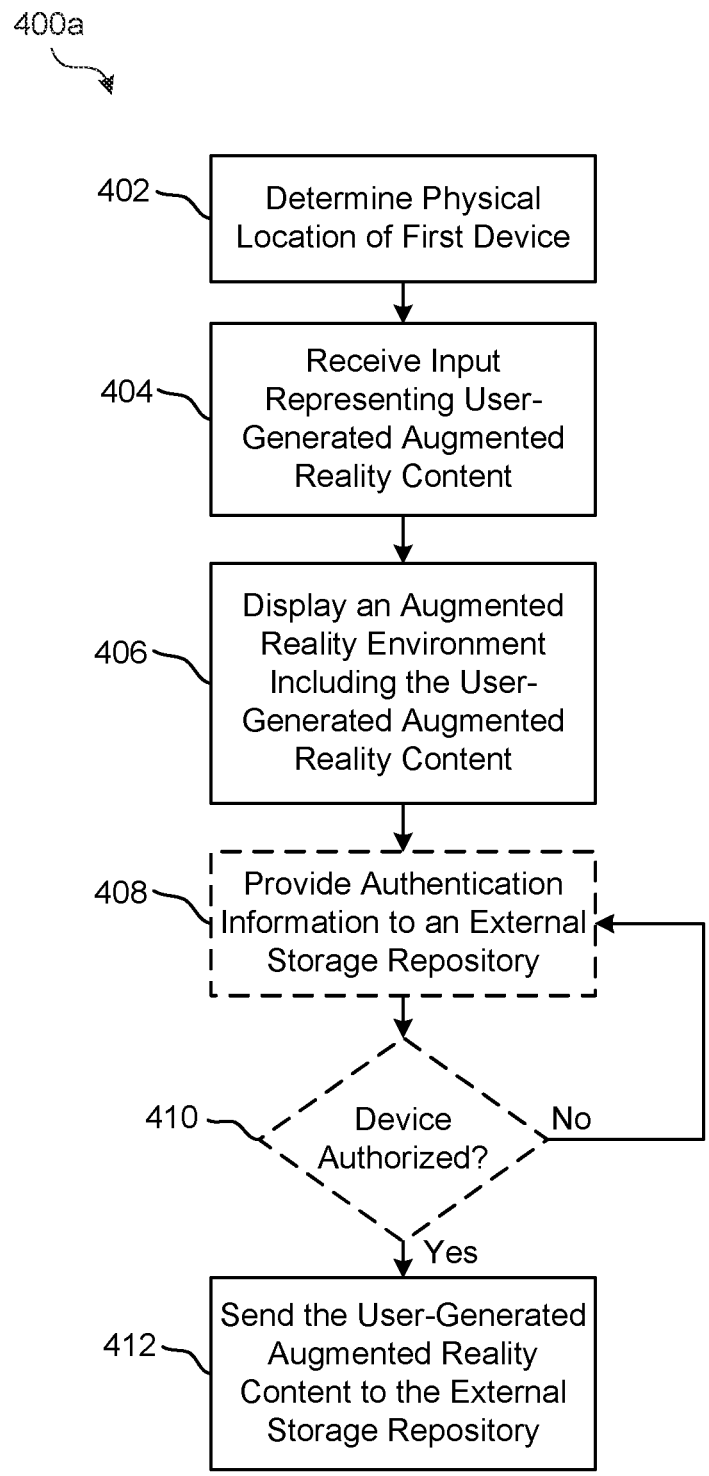
FIG. 4A illustrates an exemplary technique for generating augmented reality content.

FIG. 4A illustrates an exemplary technique 400a for generating augmented reality content on a first device and sending the content to an external storage repository. In some embodiments, the technique is carried out by system 200 described in reference to FIG. 2.

At block 402, a physical location of the first device is determined. In some embodiments, the physical location is determined using GPS. In some embodiments, the physical location is determined by detecting physical features present at the physical location (e.g., text identifying the location or landmarks associated with the location). The physical features are detected by obtaining images of the physical location using one or more image sensor(s) (such as image sensor(s) 108 described in reference to FIGS. 1A-1B).

At block 404, input is received representing user-generated augmented reality content. In some embodiments, the augmented reality content is associated with a particular physical feature at the physical location, such as a wall of a building, a statue, a tree, and so on.

At block 406, an augmented reality environment including the user-generated augmented reality content is displayed. The user-generated augmented reality content is overlaid on a live view of the physical location.

In some embodiments, at block 408, authentication information is provided to an external storage repository. At block 410, a determination is made whether the authentication information authorizes the first device to send the user-generated augmented reality content to the external storage repository.

At block 412, the user-generated augmented reality content is sent to the external storage repository. In some embodiments, the user-generated augmented reality content is sent to the external storage repository in accordance with a determination that the first device is authorized at block 410. In some embodiments, the user-generated augmented reality content includes classification information. The classification information includes genre of content (e.g., art, history, games, etc.), rating of content (e.g., explicit or not explicit), and/or type of content (e.g., authorized or unauthorized).

Figure 4B:
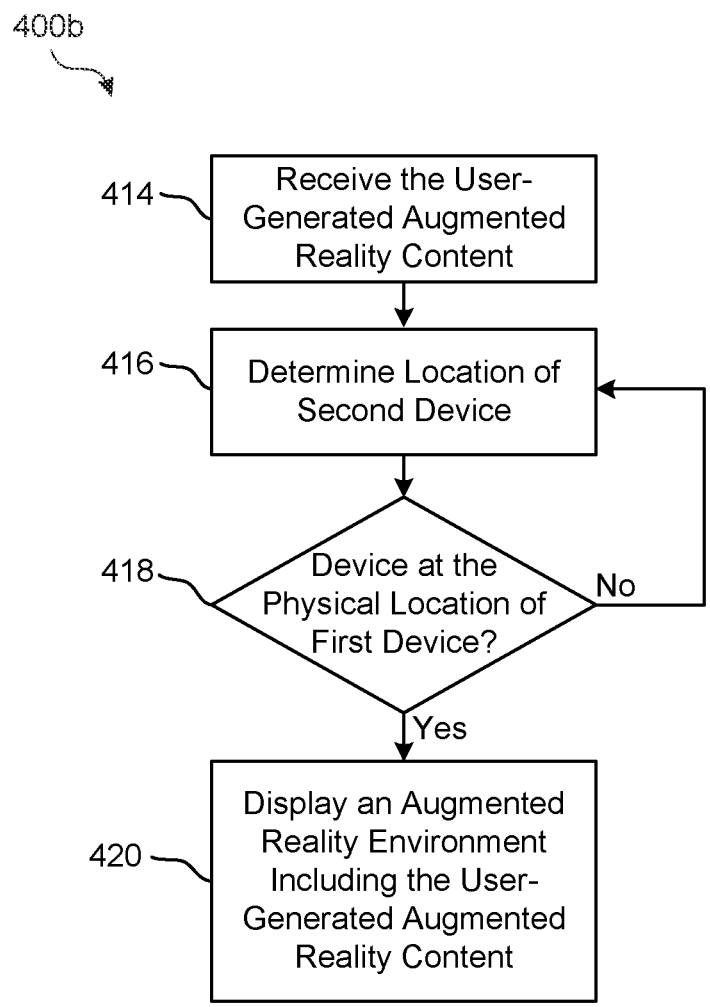
FIG. 4B illustrates an exemplary technique for displaying augmented reality content.

FIG. 4B illustrates an exemplary technique 300b for displaying on a second device the augmented reality content created on the first device in technique 300a. In some embodiments, the technique is carried out by system 200 described in reference to FIG. 2.

At block 414, user-generated augmented reality content created on the first device (e.g., at block 404 of FIG. 4A) is received. The user-generated augmented reality content is received from an external storage repository (e.g., storage repository 250 described in reference to FIG. 2).

At block 416, a current location of the second device is determined. In some embodiments, the current location is determined using GPS. In some embodiments, the current location is determined by detecting physical features present at the current location (e.g., text identifying the location or landmarks associated with the location). The physical features are detected by obtaining images of the current location using one or more image sensor(s) (such as image sensor(s) 108 described in reference to FIGS. 1A-1B).

At block 418, a determination is made whether the current location of the second device is the physical location where the first device created the augmented reality content.

At block 420, in accordance with a determination that the second device is at the physical location where the first device created the augmented reality content, an augmented reality environment including the user-generated augmented reality content created by the first device is displayed. The user-generated augmented reality content is overlaid on a live view of the physical location.

Figure 5:
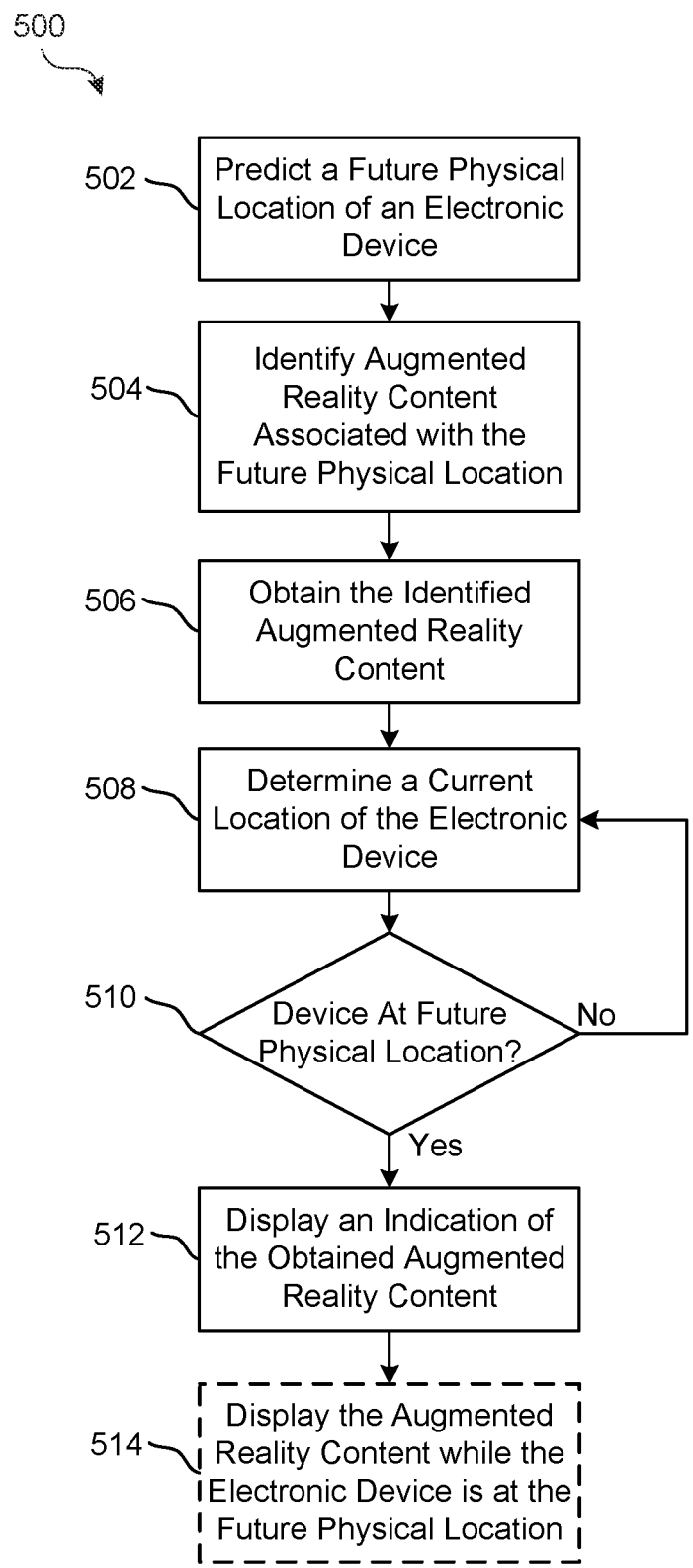
FIG. 5 illustrates an exemplary technique for obtaining augmented reality content.

FIG. 5 illustrates an exemplary technique 500 for obtaining augmented reality content. In some embodiments, the technique is carried out by system 200 described in reference to FIG. 2.

At block 502, a future physical location of an electronic device (e.g., second device 100e described in reference to FIG. 2) is predicted. In some embodiments, the predicted future physical location is predicted based on a received destination (e.g., a destination entered into GPS navigation software). In some embodiments, predicting the future physical location includes determining a direction of travel of the electronic device. In some embodiments, predicting the future physical location includes determining a proximity of the electronic device to the future physical location.

At block 504, augmented reality content associated with the future physical location is identified. In some embodiments, the augmented reality content includes virtual objects for display in an augmented reality environment. In some embodiments, the identified augmented reality content includes content associated with additional physical locations along a route to a destination (e.g., a destination entered into GPS navigation software).

At block 506, before arriving at the future physical location, the identified augmented reality content is obtained. In some embodiments, the identified augmented reality content is obtained from an external storage repository (e.g., storage repository 250 described in reference to FIG. 2).

At block 508, a current location of the electronic device is determined. In some embodiments, the current location is determined using GPS. In some embodiments, the current location is determined by detecting physical features present at the current location (e.g., text identifying the location or landmarks associated with the location). The physical features are detected by obtaining images of the current location using one or more image sensor(s) (such as image sensor(s) 108 described in reference to FIGS. 1A-1B).

At block 510, a determination is made whether the current location of the electronic device is the future physical location.

At block 512, in accordance with a determination that the electronic device is at the future physical location, an indication of the obtained augmented reality content is displayed. In some embodiments, displaying an indication of the obtained augmented reality content includes displaying an affordance indicating availability of the obtained augmented reality content for display. In some embodiments, an alert is provided when the obtained augmented reality content is available for display.

In some embodiments, at block 514, the augmented reality content is displayed while the electronic device is at the future physical location. In some embodiments, the augmented reality content is displayed in response to receiving a request to view the augmented reality content. In some embodiments, the augmented reality content is automatically displayed in response to the electronic device being at the future physical location.

As described above, one aspect of the present technology is the gathering and use of data available from various sources to provide users with augmented reality content. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver augmented reality content that is of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of augmented reality content delivery services, the present technology can be configured to allow users to select to "opt in" or "opt out" of participation in the collection of personal information data during registration for services or anytime thereafter. In another example, users can select to limit the length of time personal information data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, augmented reality content can be selected and delivered to users by inferring preferences based on non-personal information data or a bare minimum amount of personal information, such as the content being requested by the device associated with a user, other non-personal information available to the augmented reality content delivery services, or publicly available information.

While the present disclosure has been shown and described with reference to the embodiments provided herein, it will be understood by those skilled in the art that various changes in form and details may be made without departing from the scope of the present disclosure.

What is claimed is:

1. An electronic device, comprising:
   one or more processors; and
   memory storing one or more programs configured to be executed by the one or more processors, the one or more programs including instructions for:
   predicting a future physical location of an electronic device;
   identifying augmented reality content associated with the future physical location, wherein the augmented reality content is associated with the future physical location based on a previous user request to associate the augmented reality content with the future physical location;
   before the electronic device arrives at the future physical location, obtaining the identified augmented reality content;
   upon arriving at the future physical location, displaying an affordance indicating availability of the obtained augmented reality content for display;
   receiving a request to view the obtained augmented reality content; and
   in response to receiving the request to view the obtained augmented reality content, displaying the obtained augmented reality content.

2. The electronic device of claim 1, wherein the one or more programs further include instructions for:
   obtaining images from one or more image sensors, wherein the obtained images include one or more predefined physical features present at the future physical location; and
   determining a current location of the electronic device based at least in part on the obtained images.

3. The electronic device of claim 1, wherein the augmented reality content is displayed while the electronic device is at the future physical location.

4. The electronic device of claim 1, wherein the one or more programs further include instructions for:
   providing an alert when the obtained augmented reality content is available for display.

5. The electronic device of claim 1, wherein the one or more programs further include instructions for:
   receiving a destination, wherein the predicted future location is based on the received destination.

6. The electronic device of claim 5, wherein the identified augmented reality content includes content associated with additional physical locations along a route to the destination.

7. The electronic device of claim 1, wherein predicting the future physical location comprises:
   determining a direction of travel of the electronic device.

8. The electronic device of claim 1, wherein predicting the future physical location comprises:
   determining a proximity of the electronic device to the future physical location.

9. A non-transitory computer-readable storage medium storing one or more programs configured to be executed by one or more processors, the one or more programs including instructions for:
   predicting a future physical location of the electronic device;
   identifying augmented reality content associated with the future physical location, wherein the augmented reality content is associated with the future physical location based on a previous user request to associate the augmented reality content with the future physical location;
   before the electronic device arrives at the future physical location, obtaining the identified augmented reality content;
   upon arriving at the future physical location, displaying an affordance indicating availability of the obtained augmented reality content for display;
   receiving a request to view the obtained augmented reality content; and
   in response to receiving the request to view the obtained augmented reality content, displaying the obtained augmented reality content.

10. The non-transitory computer-readable storage medium of claim 9, wherein the one or more programs further include instructions for:
    obtaining images from one or more image sensors, wherein the obtained images include one or more predefined physical features present at the future physical location; and
    determining a current location of the electronic device based at least in part on the obtained images.

11. The non-transitory computer-readable storage medium of claim 9, wherein the augmented reality content is displayed while the electronic device is at the future physical location.

12. The non-transitory computer-readable storage medium of claim 9, wherein the one or more programs further include instructions for:
    providing an alert when the obtained augmented reality content is available for display.

13. The non-transitory computer-readable storage medium of claim 9, wherein the one or more programs further include instructions for:
    receiving a destination, wherein the predicted future location is based on the received destination.

14. The non-transitory computer-readable storage medium of claim 13, wherein the identified augmented reality content includes content associated with additional physical locations along a route to the destination.

15. The non-transitory computer-readable storage medium of claim 9, wherein predicting the future physical location comprises:
    determining a direction of travel of the electronic device.

16. The non-transitory computer-readable storage medium of claim 9, wherein predicting the future physical location comprises:
    determining a proximity of the electronic device to the future physical location.

17. A method, comprising:
    predicting a future physical location of the electronic device;
    identifying augmented reality content associated with the future physical location, wherein the augmented reality content is associated with the future physical location based on a previous user request to associate the augmented reality content with the future physical location;

before the electronic device arrives at the future physical location, obtaining the identified augmented reality content;

upon arriving at the future physical location, displaying an affordance indicating availability of the obtained augmented reality content for display;

receiving a request to view the obtained augmented reality content; and in response to receiving the request to view the obtained augmented reality content, displaying the obtained augmented reality content.

18. The method of claim 17, further comprising:

obtaining images from one or more image sensors, wherein the obtained images include one or more predefined physical features present at the future physical location; and determining a current location of the electronic device based at least in part on the obtained images.

19. The method of claim 17, wherein the augmented reality content is displayed while the electronic device is at the future physical location.

20. The method of claim 17, further comprising:

receiving a destination, wherein the predicted future location is based on the received destination.

21. The method of claim 17, wherein predicting the future physical location comprises:

determining a direction of travel of the electronic device.

22. The method of claim 17, wherein predicting the future physical location comprises:

determining a proximity of the electronic device to the future physical location.

* * * * *